C. TOWL AND D. J. SMITH.
MEANS FOR AUTOMATICALLY OPERATING BULKHEAD DOORS, SLUICE GATES, AND THE LIKE.
APPLICATION FILED FEB. 3, 1916.

1,323,424.

Patented Dec. 2, 1919.
6 SHEETS—SHEET 1.

Fig 1

C. TOWL AND D. J. SMITH.
MEANS FOR AUTOMATICALLY OPERATING BULKHEAD DOORS, SLUICE GATES, AND THE LIKE.
APPLICATION FILED FEB. 3, 1916.

1,323,424.

Patented Dec. 2, 1919.
6 SHEETS—SHEET 4.

C. TOWL AND D. J. SMITH.
MEANS FOR AUTOMATICALLY OPERATING BULKHEAD DOORS, SLUICE GATES, AND THE LIKE.
APPLICATION FILED FEB. 3, 1916.

1,323,424.

Patented Dec. 2, 1919.
6 SHEETS—SHEET 5.

C. TOWL AND D. J. SMITH.
MEANS FOR AUTOMATICALLY OPERATING BULKHEAD DOORS, SLUICE GATES, AND THE LIKE.
APPLICATION FILED FEB. 3, 1916.

1,323,424.

Patented Dec. 2, 1919.
6 SHEETS—SHEET 6.

UNITED STATES PATENT OFFICE.

CHARLES TOWL, OF FOREST GATE, AND DAVID J. SMITH, OF FINSBURY PARK, LONDON, ENGLAND.

MEANS FOR AUTOMATICALLY OPERATING BULKHEAD-DOORS, SLUICE-GATES, AND THE LIKE.

1,323,424.   Specification of Letters Patent.   Patented Dec. 2, 1919.

Application filed February 3, 1916. Serial No. 76,031.

*To all whom it may concern:*

Be it known that we, CHARLES TOWL, a subject of the King of Great Britain, and a resident of 155 Earlham Grove, Forest Gate, Essex, England, and DAVID JOSEPH SMITH, a subject of the King of Great Britain, and a resident of 40 Woodberry Grove, Finsbury Park, London, N., England, have invented Means for Automatically Operating Bulkhead-Doors, Sluice-Gates, and the like, of which the following is the specification.

This invention relates to a method of and means for automatically operating bulkhead doors, sluice gates and the like.

Many vessels have been lost even when provided with watertight compartments or bulkheads with closing doors, because either the closure doors could not be operated in time, or because the more or less complicated mechanism provided for the purpose of closing them was not operated in time, or such mechanism became injured in a gale, or otherwise, or became jammed or locked.

The object of this invention is to provide apparatus for automatically operating the closure doors as employed in ships or for operating sluice gates and the like.

The apparatus comprises a suitable box or casing preferably of metal termed a generator. The generator has a valve opening inward which allows the water to flow freely into the interior of the generator. Within the generator and held in a suitable receptacle preferably detachable, is a quantity of some substance such as carbid of calcium which has the property of giving off gas when in contact with water. The gas produced by the carbid or the like is conveyed by means of a suitable duct or ducts to a cylinder or cylinders in which a piston or pistons is or are adapted to slide. Each piston is provided with suitable rods, links or other connection to the door to be operated.

When water flows into the generator, gas is produced at a pressure, whereby the piston is moved in the cylinder and by means of the connections, the door is closed.

Or the doors may be closed by the aid of a weight or weights released by the said piston or the like, or the gas pressure may serve to release a detent permitting the operation of a spring or springs attached to the door, the door being held open against the action of the weights or springs by a detent, or catch or the like, the said detent being released by the action of the piston rod attached to a piston working inside a cylinder communicating with the generator.

The generator is placed on or near to the deck floor adjacent the door to be closed, and on water entering the ship, the water enters through the said valve or opening provided, and flowing into the generator is brought into contact with the gas producing material contained therein. Gas is immediately generated and as the valves admitting water open inward only, the gas passes by means of a duct or pipe to the cylinder and forces out the piston rods which close the bulkhead door or doors and release the detent or the like. As applied to a sluice gate the said means may be employed to open the gate.

We may utilize the generator and apparatus to automatically operate the valve or valves of hydraulic gear or apparatus as at present employed on ships by means manually controlled from the deck or the like, which hydraulic or like apparatus serves to directly close bulkhead doors in the ship.

We may suitably connect the piston before described by a lever, link, or rack and screw, or by other suitable means to the valve of the hydraulic ram or apparatus. By this means, when, owing to collision or injury occurring to a vessel, leakage of water into the hold or the like occurs, rising to a sufficient height to reach the said generator, gas pressure causes the said piston to be operated, thereby opening or operating the valve of the hydraulic or like gear, by which means the bulkhead door is closed.

In like manner sluice gates or the like may be opened or closed as may be desired, a similar generator being placed adjacent the gate and at the desired level so that the water may flow into the generator when it reaches the level at which it is desired that the gate shall be operated.

It will of course be understood that the said piston and automatic apparatus described herein, may be employed to operate the valve of a steam or other pressure operated gear, wherever such may be employed, as applied to operating bulkhead doors. Or it may be employed to operate a hydraulic valve with electric apparatus intermediately arranged, that is to say, in those vessels in which the hydraulic valve is electrically operated, the said automatic generator may serve to provide the movement for completing a circuit or otherwise to energize or to permit of the energization of the said electric apparatus operating the hydraulic valve, the essential element being that the said hydraulic valve is automatically operated whether directly or intermediately. Or our said apparatus may be employed to switch on the electrical current to energize the electrical machinery employed to close bulkhead doors or the like.

It is known to produce gas under pressure in a closed receptacle or generator, by the inflow of water acting upon a chemical such as carbid of calcium contained within the said generator.

Any suitable generator of gas under pressure by the addition to or inflow of water thereto, may be employed with our apparatus.

And in order that our invention may be completely understood reference should be made to the accompanying sheets of drawings which illustrate diagrammatically some examples of the application of our invention to a door or gate of the kind referred to.

Figs. 9 and 10 show the application of our apparatus to automatically and directly operate an electric switch in those vessels in which known electric mechanism is employed to effect the closing of the door.

Figure 1:
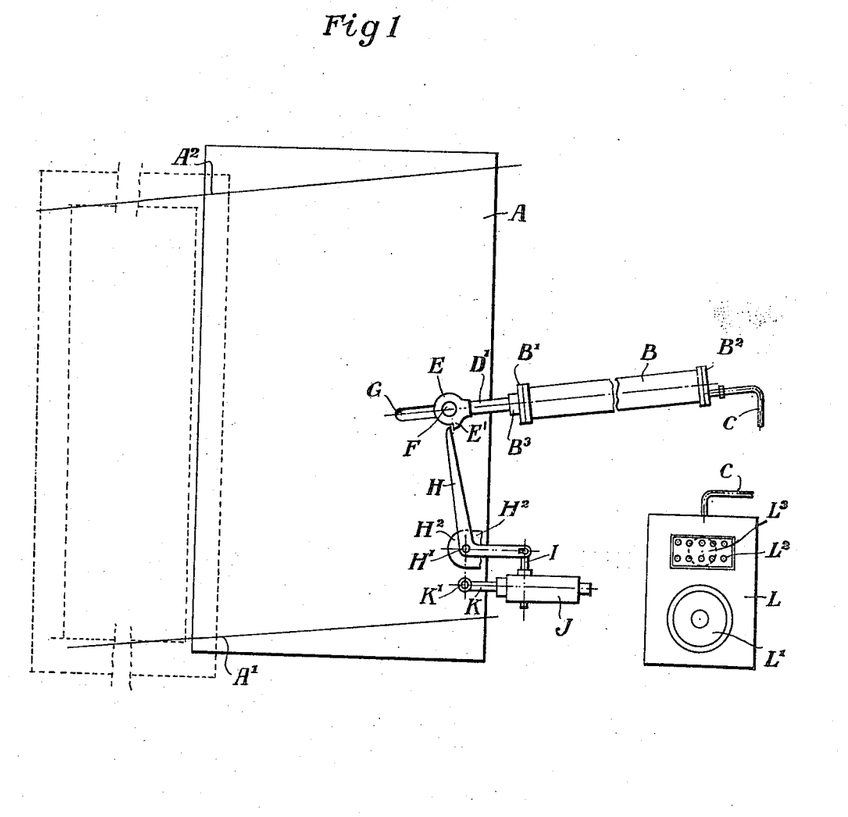
Figure 1 is an elevation showing the employment of our operating means for directly closing a bulkhead door after releasing a detent.

Referring to Fig. 1, A indicates the bulkhead door, B the cylinder having the closed ends or cover plates $B^1$, $B^2$. C is the gas supply pipe or duct leading from the gas generator, which pipe is connected to the cover plate $B^2$. The cover $B^1$ is provided with the guide $B^3$ through which the piston rod $D^1$ is adapted to slide. The rod $D^1$ has secured at its end the head E carrying the bolt or stud F, the head of which fits within the slot G formed in the door or gate A. The slot G does not extend through the door. The piston rod head E is formed with the lug or projection $E^1$ which is adapted to engage with the end of the bellcrank lever H. The lever H is fulcrumed at $H^1$ in a bracket $H^2$ (shown broken off) rigidly secured to the wall of the bulkhead. The other end of the lever H is pivotally secured to the detent or bolt rod I which is adapted to slide in a vertical guide arranged or bored transversely in the metal guide J which is preferably a casting rigidly secured to the bulkhead wall. The bulkhead wall is not shown. The guide casting J has also formed therein longitudinally a guide for the bolt or rod K, the end or eye of which is pivotally secured to the pin $K^1$. The pin $K^1$ is fixed in the door A. The construction and operation of the detent I and guide J are similar to those afterward more fully described with reference to Figs. 4, 5 and 6.

The gas generator L is diagrammatically shown. It is provided with the detachable perforated receptacle for carbid of calcium or the like $L^1$, and the perforated water inlet $L^2$. A non-return valve for the passage to the interior of the generator is indicated by the dotted circle $L^3$. The outlet pipe or duct C for gas under pressure is connected to the cylinder B.

The dotted lines to the left of Fig. 1, indicate the closed position of the door A. The door if arranged in any usual manner on rollers (not shown) to slide laterally, may have its movement assisted by being arranged upon a decline indicated by the lines $A^1$ $A^2$. It will be understood however that this is not necessary, as the cylinder capacity must be such as to insure that the resistance due to the weight and friction and possible obstructions on the slideways or rails may be overcome.

It will be observed that the length of stroke of the piston and rod in the cylinder B must be that necessary to close the door A plus the length of the slot G, as the stud F does not commence to move the door until the detent bolt I has been withdrawn from its guide by the lever H and the stud F contacts with the end of the slot G.

When a leakage of water occurs from any cause into the hold of the vessel and the water rises sufficiently to flow into the inlet $L^2$ of the generator which is placed at the desired level and the water passes the non-return valve indicated at $L^3$, gas is generated from the carbid or the like contained in the generator, the pressure of gas closes the valve, and the gas pressure in the cylinder B forces the piston outwardly and by means of the nose $E^1$ and the lever H withdraws the detent bolt I and then the piston rod head E by engagement with the end of the slot G closes the door A.

Figure 2:
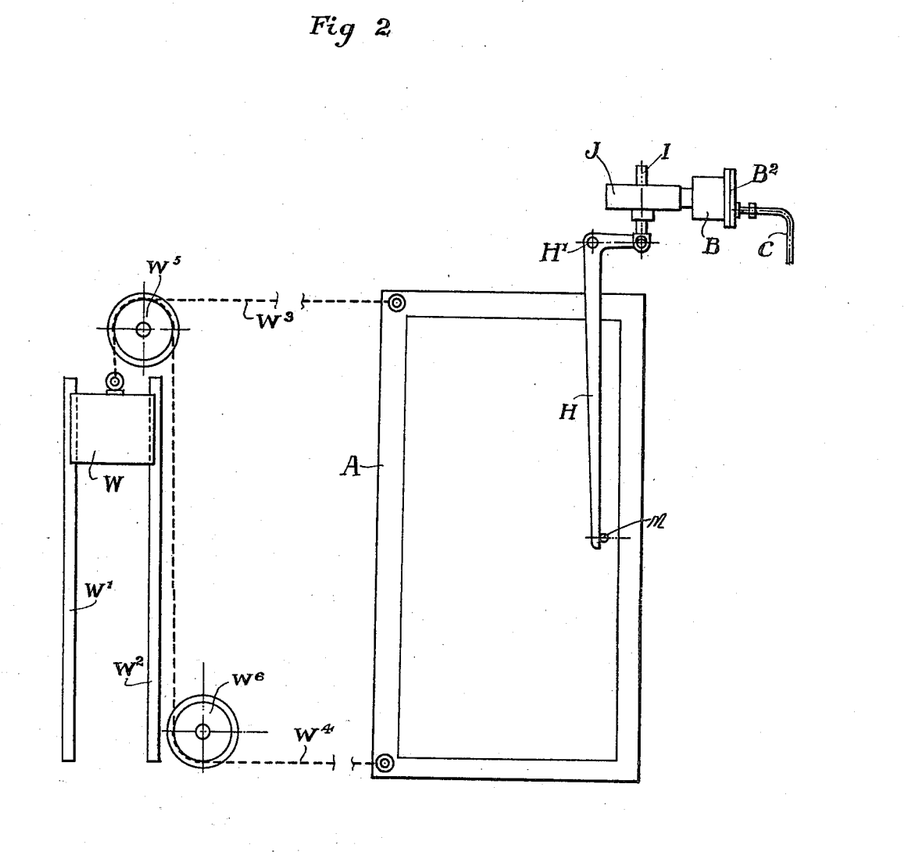
Fig. 2 is an elevation showing our invention as applied in indirectly operating the door, releasing a detent securing the door in the open position and thus permitting the door to be closed by a weight.

In the example of our invention shown in Fig. 2, the door A is operated by the weight W which is adapted to slide vertically between the guide bars $W^1$, $W^2$, our apparatus serves to hold the door in the open position as shown and to release the detent which permits the weight to fall and the door to slide laterally to close same. The weight W is suspended by two chains or the like $W^3$, $W^4$, which both pass over the pulley $W^5$, the chain $W^3$ being connected at its other end to the top of the door A and the other chain $W^4$ being connected to the bottom of the door, after passing around the pulley $W^6$. In this example only a very short stroke is required of the piston in the cylinder B, the degree of movement necessary to release the detent bolt I from its guide J.

The lever H is fulcrumed on the fixed pin $H^1$ secured in the bulkhead wall, and has pivotally secured at one end the detent bolt I. The other end engages the pin or stud M secured in the door A. The lever H thus serves to hold open the door against the pull of the weight W.

When the water reaches the generator (not shown in this figure) and produces a pressure of gas upon the piston in the cylinder B, the piston rod releases the detent bolt I, and permits the door A to move forward under the action of the weight W and to close the door.

Figure 3:
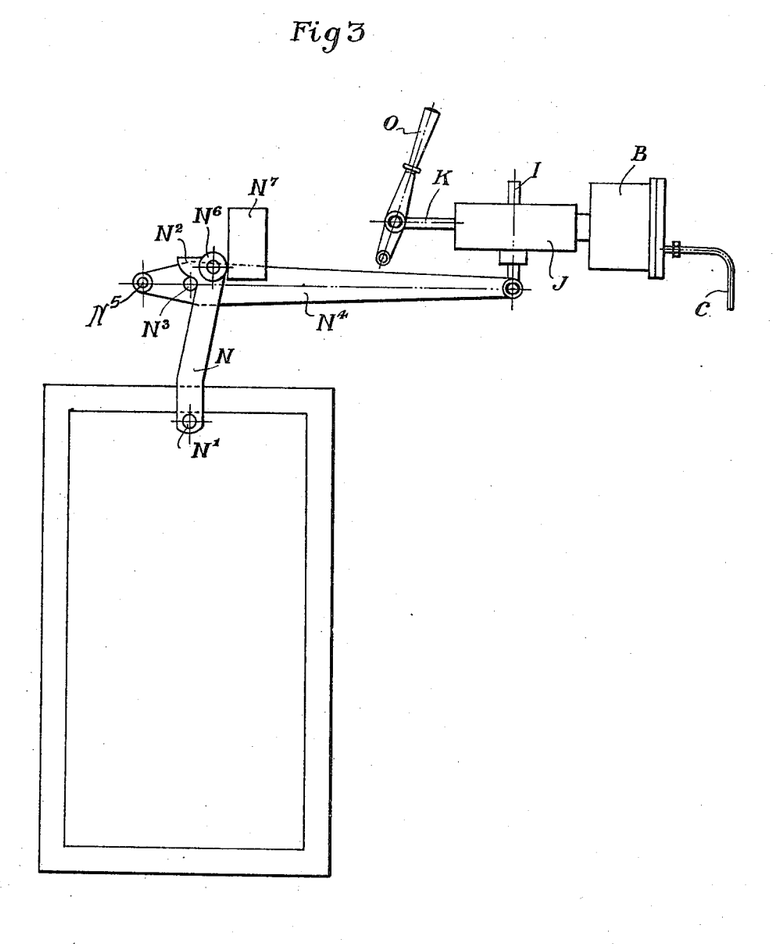
Fig. 3 is an elevation illustrating another example of indirect operation wherein the door is by releasing a detent permitted to fall by its own weight to close the door.

Referring to Fig. 3, the door A is suspended from the releasing mechanism by the link or rod N which is pivotally secured to pin $N^1$ secured in the door. The door is held in vertical guides (not shown) which may be of a similar kind to those shown in Fig. 2 for the weight W one on each side of the doorway.

The end of the link N is formed with the nose or projection $N^2$ which rests upon the pin $N^3$ fixed in the lever $N^4$. The lever $N^4$ is fulcrumed on the pin $N^5$ secured in the bulkhead wall or other convenient part of the ship and is supported at the other end by the detent bolt I which is of the same construction as that afterward described with reference to Figs. 4, 5 and 6. The head of the link N is provided with the roller $N^6$ rotatably mounted on a pin which roller engages the fixed block $N^7$ which block so long as the bolt I is held in its guide assists to support the weight of the door. In this example of our invention we provide the lever O to be operated by hand when necessary in order to release the bolt I or to replace same in the detent position as shown.

When the piston in the cylinder B is moved forward by the pressure of gas from the generator and the detent bolt I is released in the manner afterward described, the lever $N^4$ falls, thus releasing the link N and permitting the door to fall and close the bulkhead. As the lever $N^4$ moves downwardly the roller $N^6$ disengages from the block $N^7$ and thus permits the link N to swing to the right as the nose $N^2$ disengages from the lever pin $N^3$.

Figure 4:
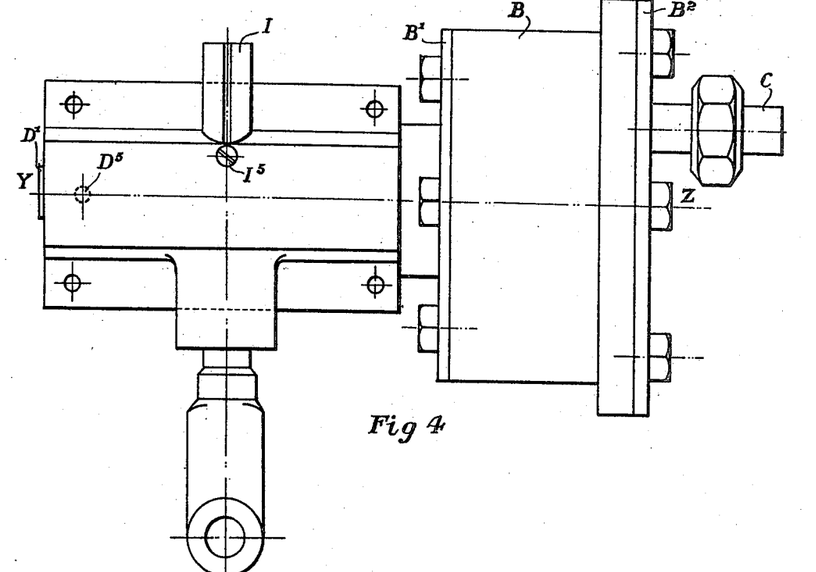
Fig. 4 is an elevation to a larger scale of the piston and cylinder together with the preferred form of detent.
Figure 5:
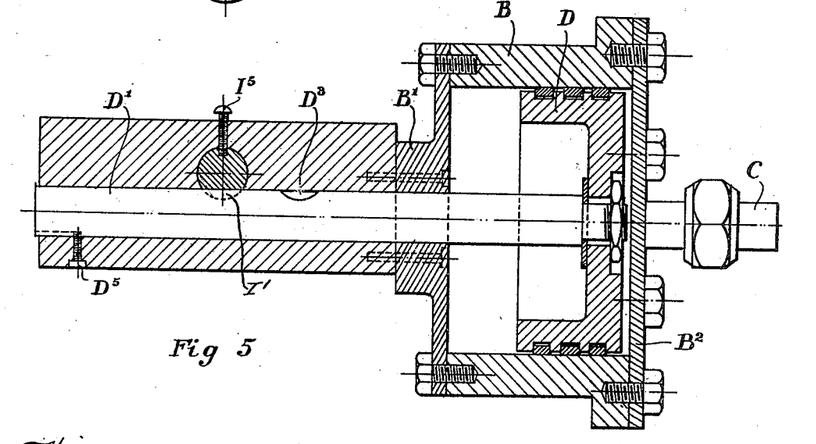
Fig. 5 is a section on the line Y Z of Fig. 4.
Figure 6:
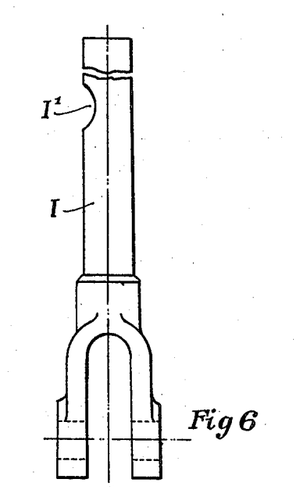
Fig. 6 is a separate view of the detent rod or belt.

Referring to Figs. 4, 5 and 6, the gas is admitted to the cylinder B by the pipe C, and the gas pressure moves the piston D forward, and the rod $D^1$ fixed to it is moved with it. A semi-circular recess $D^3$ is formed in the rod $D^1$ and a corresponding semi-circular recess $I^1$ is formed in the detent bolt or rod I. The rod $D^1$ fits within the recess $I^1$ and is capable of sliding therein, but the rod I is held longitudinally. When the rod $D^1$ is pushed forward by the piston, the recess $D^3$ registers with the recess $I^1$ and permits the detent bolt I to slide longitudinally in its guide and thus be withdrawn therefrom. The screws $D^5$ and $I^5$ are fitted to slide in slots in the rods $D^1$ and I respectively, to prevent same from turning.

Figure 7:
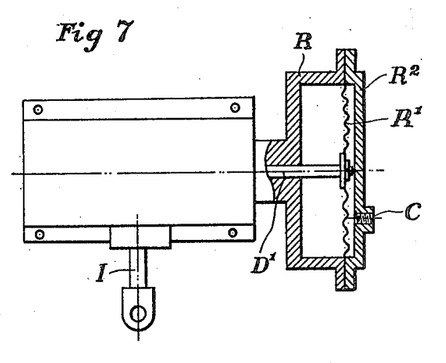
Fig. 7 is a part section of an alternative arrangement in which a flexible diaphragm is employed to operate the detent instead of a piston.

Referring to Fig. 7, this shows an alternative means for operating the rod $D^1$ in its guide. In lieu of the piston a flexible diaphragm $R^1$ is secured in known manner in a cylinder R which is closed by the cover plate $R^2$ having the inlet C for gas. The rods $D^1$ and I otherwise act in the same manner as before described.

Figure 8:
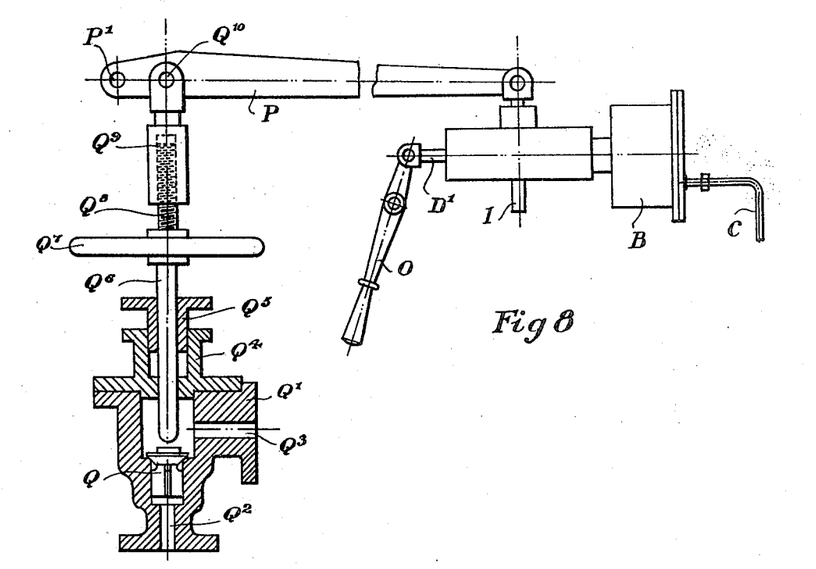
Fig. 8 is an elevation partly in section illustrating the employment of our apparatus to release a steam or hydraulic valve for admitting steam or water pressure to steam or hydraulic machinery as at present used for operating bulkhead doors.

Referring to Fig. 8, the cylinder B and its piston, the rod $D^1$ and the detent bolt I all operate as before described. The valve casing $Q^1$ has the inlet passage $Q^2$ for steam or water immediately beneath the valve Q which is provided with a suitable seating and the outlet passage $Q^3$ above the valve. The valve Q may conveniently be of the type formed with radial webs to slide in the guide for same in the valve casing. The valve casing cap or cover $Q^4$ is provided with the gland $Q^5$ through which the rod $Q^6$ is capable of sliding, and which is adapted when adjusted to press upon the top of the valve Q to hold same to its seat. The rod $Q^6$ has secured thereto the handwheel $Q^7$, and the other end of the said rod is provided with a screw thread $Q^8$ fitting the female thread in the arm Q⁹ which arm is pivotally secured by a fork to a pin Q¹⁰ on the lever P. The lever P is fulcrumed on a pin P¹ which is rigidly secured in the frame of the bulkhead or the like. The other end of the lever has the detent bolt I secured thereto.

When the detent bolt I is secured in position in its guide by the rod D¹ as before described, the wheel Q⁷ is turned in order to screw down the end of the rod Q⁶ upon the valve Q.

When the detent bolt I is released by the pressure of the gas in the cylinder B as before described, the valve Q is raised by the pressure of the fluid beneath it and the said operating fluid, steam, or water, is permitted to flow to the machine operated thereby, for the purpose of closing the bulkhead door or doors. The hand lever O is provided to conveniently reset the bolt or rod D¹ with relation to the detent I.

Figure 9:
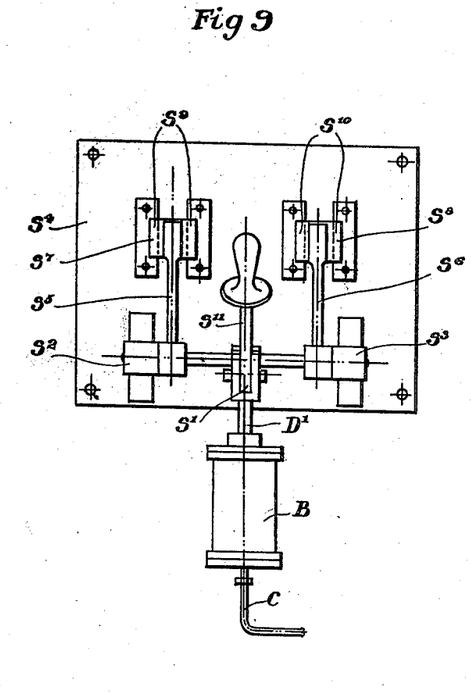
Fig. 9 is an elevation and Fig. 10 is a side view of the automatic switch operating mechanism.
Figure 10:
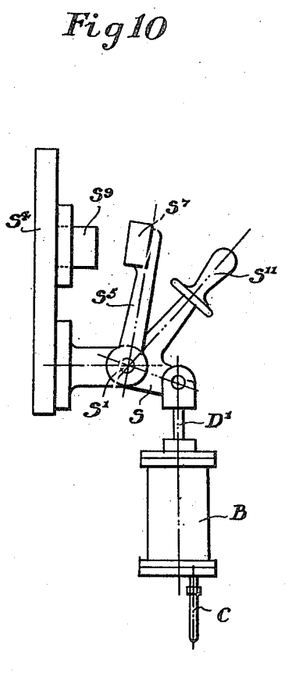

Referring to Figs. 9 and 10, the cylinder B is connected by the pipe or duct C to a generator of gas pressure of the type before described. The piston in the cylinder B is connected by its rod D¹ to the lever arm S, which is rigidly secured to the short shaft S¹ mounted in the bearing S² S³ which are fixed on the switch board S⁴. Rigidly secured to the same shaft are the pair of switch arms S⁵ S⁶ carrying the contact pieces S⁷ S⁸, which are adapted to contact with the plates S⁹ S¹⁰ secured on the switch board.

Suitable connections and insulations are provided which are not shown. The hand lever S¹¹ is fitted to move the piston back into its operative position.

When the water rises in the hold of the vessel or the like sufficiently to flow into the generator, the gas pressure produced as before described, moves the piston in the cylinder and thereby the contact pieces S⁷ S⁸ are moved into electrical connection with the plates S⁹ S¹⁰ by which the current is conveyed to energize the electrical apparatus employed to close the bulk-head door or doors, or open or close, as may be desired, the sluice gate or the like.

It will be understood that when it is desired to close the door directly the area of the water inlet is such relatively to the amount of carbid or the like for the water to operate upon, that a large volume of gas is rapidly generated.

What we do claim as our invention and desire to secure by Letters Patent is:—

1. Means for controlling the operation of bulkhead doors or the like comprising a generator for generating gases operated by inflowing water, an expansion chamber associated with the generator said chamber containing a piston, and a detent mechanism for holding the door in open position consisting of a member shifted by the piston upon reciprocation of the same and means actuated by the movement of said member for allowing the door to close.

2. Means for operating a door or the like comprising a cylinder having a reciprocating piston therein, of a generator adapted to automatically produce a pressure fluid by the inflow of water therein, and operating means between said piston and the door for permitting a movement of the door upon a reciprocation of the piston.

3. Means for controlling the operation of bulkhead doors or the like comprising a generator for generating gases operated by inflowing water, an expansion chamber associated with the generator, said chamber containing a piston, and a detent mechanism for holding the door in open position consisting of a vertical connecting rod disposed at right angles to the piston, and movable relative thereto upon reciprocation of the same, and means operated upon movement of the rod for allowing the door to close.

4. Means for controlling the operation of bulkhead doors or the like comprising a generator for generating gases operated by inflowing water, an expansion chamber associated with the generator, a horizontal reciprocating piston rod contained within the chamber, a groove in said piston rod, and detent mechanism for holding the door in open position comprising a vertically movable connecting rod, a groove in said connecting rod, the grooves in the piston rod and the connecting rod adapted to register upon reciprocation of the piston, thereby allowing the connecting rod to move, and means operated by the movement of the connecting rod for allowing the door to close.

5. Means for operating a door or the like comprising a cylinder adapted to receive a movable piston, of a generator for automatically producing pressure gases upon the introduction of water thereto in communication with said cylinder, and means connected with said piston to be moved thereby upon the reciprocation of the piston to permit the door to automatically close when pressure gases have been generated in the generator and delivered to said cylinder.

6. Means for operating doors or the like comprising a cylinder having a movable piston therein, of a generator for automatically producing pressure gases upon the introduction of water thereto in communication with said cylinder, instrumentalities operated by the piston upon a movement thereof to permit closing of the door, and other means for positively closing said door upon the operation of the instrumentalities by said piston.

7. Means for operating doors or the like comprising a cylinder having a movable piston therein, of a generator for automatically producing pressure gases upon the introduction of water thereto in communication with said cylinder, instrumentalities operated by the piston upon a movement thereof to permit closing of the door, and other means for positively closing said door upon the operation of the instrumentalities by said piston, said means comprising movable elements flexibly connected with said doors.

CHARLES TOWL.
DAVID J. SMITH.

Witnesses:
J. D. ROOTS,
C. A. CARLISLE.